March 19, 1963   F. L. CLEMENT   3,082,039
TAG TRAILER
Filed Sept. 17, 1962
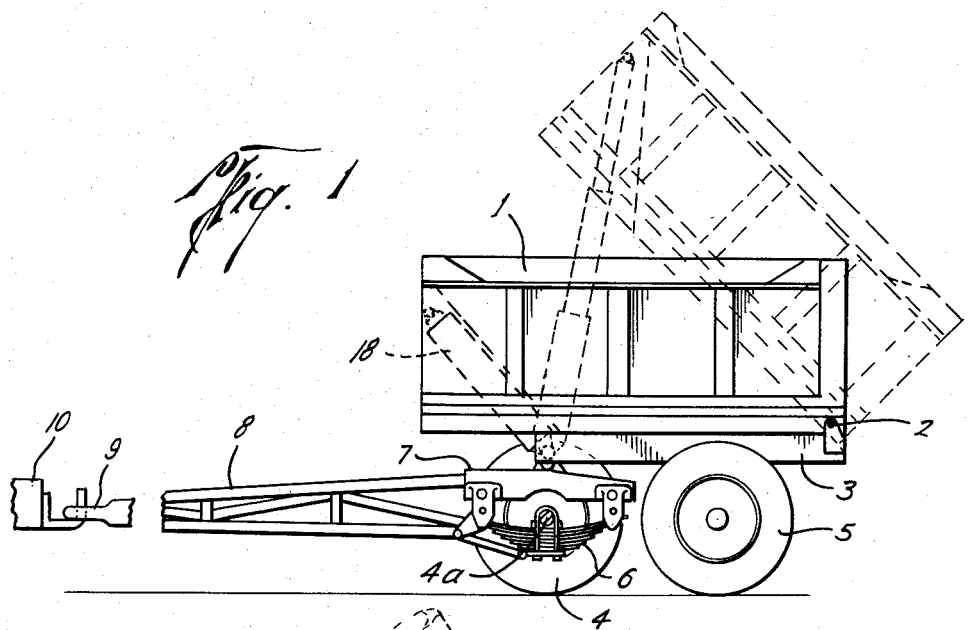
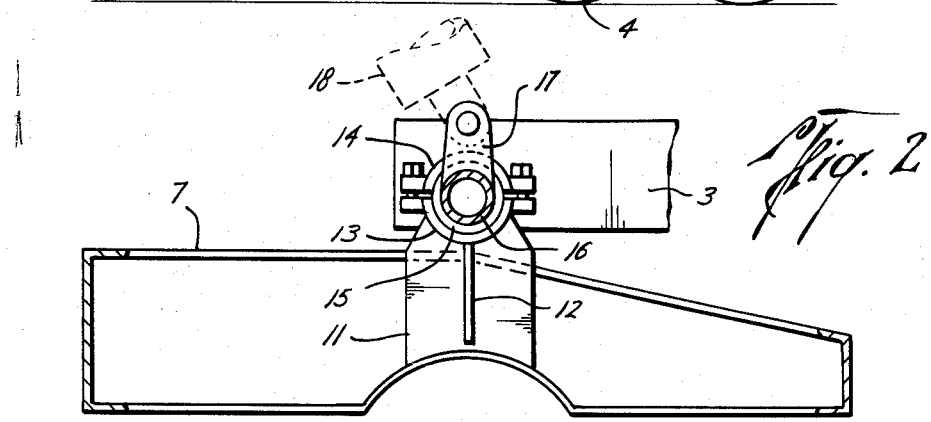
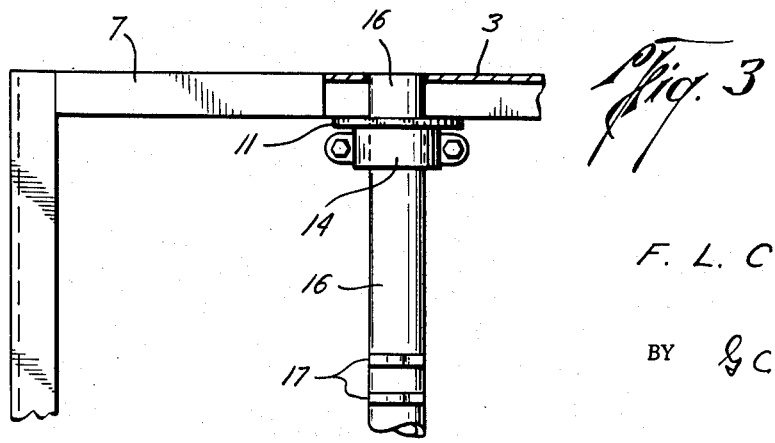
F. L. Clement
INVENTOR.
BY  GC Helmig
ATTORNEY 3,082,039
TAG TRAILER
Frank L. Clement, % Clement-Braswell Inc.,
P.O. Box 696, Minden, La.
Filed Sept. 17, 1962, Ser. No. 223,975
8 Claims. (Cl. 298—17)

This invention relates to self-supporting multiple axle trailers and more particularly to improved running gear of utility especially with a highway trailer for transportation of heavy loads and for coupling by a relatively long draft attachment to a front tow vehicle in order to space front and rear vehicles a proper distance apart as to be within allowable weight restrictions on certain roadbeds and bridge spans.

An object of the invention is to provide trailer running gear which minimizes and stabilizes against sway and jackknifing during highway travel.

A further object is to provide a multiple axle trailer in which a main frame is suspended by the rear axle and a forward subframe and tow bar are relatively immovable and together form a rigid or solid unit suspended by the front axle and pivotally connected above the axle with the main frame in a manner to accommodate relative rocking of the frames about a transverse horizontal axis while maintaining fore and aft frame alignment.

Other objects are to provide a multiple axle trailer in which a tow bar-subframe unit is mounted on the front axle and has a transverse hinge pin connection with the main frame above and in substantially vertical alignment with the front axle and additionally to provide the main frame with a rearward dumping body having lift mechanism mounted on the framing structure in substantially vertical alignment with the axle whereby body load transference avoids unbalance of the subframe on its axle and maintains the long forwardly projecting tow bar free of leverage forces from and the support of main frame weight.

Other objects and features of advantage will appear from the following specification taken with the accompanying drawing in which:

FIG. 1 is a side elevation partly in section of the improved running gear and trailer structure;

FIG. 2 is an enlarged longitudinal section of portions of the main frame and subframe and their transversely hinged interconnection and the section is taken adjacent the longitudinal center line of the vehicle; and FIG. 3 is a top plan view of the parts shown in FIG. 2.

In the drawing, the dump body 1 is of standard construction and at its rear end is pivotally mounted at 2 on a transverse axis at the side rails of the usual rectangular type of main frame 3. The ground engaging running gear consists of a pair of closely coupled front and rear wheel and axle assemblies 4 and 5. The rear assembly 5 includes the usual suspension spring which is shackled under the rearward portion of the main frame 3. Because of the close coupling of the forward and rearward wheel and axle assemblies and of the inherent flexibility contained in the assemblies, the vehicle will round road curves without provision of wheel steering mechanism. In the case of the front wheel assembly, the relatively stiff multiple leaf spring 6 is slung beneath and is centrally secured to the axle 4a and at opposite ends it is bracketed on a rectangular subframe 7. The subframe consists of a pair of longitudinally extending side members disposed directly above the axle connecting springs 6 adjacent the road wheels at opposite ends of the axle 4a. Such side frame members are joined together at the front and rear by a pair of cross framing elements. Immovably secured, as by welding, bolting or the like, to the front of the subframe 7 and constituting a fixed unit therewith, is a long forwardly projecting tow bar structure 8 which terminates forwardly in an eye or socket 9 for detachable connection to a hitch hook at the rear of a towing vehicle of which a fragment is shown at 10. The contemplated over-all length of the tow bar 8 is on the order of sixteen feet, more or less, and maintains the prescribed longitudinal spacing between the roads wheels of towing and trailing vehicles.

As soon in FIGS. 2 and 3, the longitudinal side rails of the subframe 7 each has welded thereto an upstanding plate 11 which, together with a transverse gusset plate 12 mount a semicircular socket member 13 over which is detachably bolted a cap 14. Each socket 13 and its cap 14 are interiorly lined with and hold under compressive stress an elastic bushing sleeve 15 of neoprene or the like in embracing relation on a transverse shaft or tube 16 near its end. Relative rocking movement of the main and subframes about the transverse axis of the shaft 16 is accommodated by deformation of the elastic bushing 15. Opposite ends of the tubular shaft 16 project for short distances beyond the transversely spaced apart socket members of the subframe, as seen in FIG. 3, and are welded or otherwise rigidly secured to the side frame elements of the rectangular main frame 3. Thus the hingedly supported shaft constitutes a cross member joining the forward ends of the main frame side rails.

It will be noted from the drawing that the trunnion connection between the frames is located by the subframe directly above and in substantial vertical alignment with the transverse axis of the front axle 4a, whereby the main frame load will be transferred through the subframe and to the road axle without tending to tilt the subframe and tow bar unit when the parts are coupled to a towing vehicle and without placing any of the main frame load on the tow bar and transference thereof into the towing vehicle.

Adjacent the longitudinal center line of the vehicle and midway of the trunnion connections between the frames, the crossbar or pivot shaft 16 of the main frame has welded thereto a pair of upstanding ears 17 to receive between them and pivotally mount the lower end of a hydraulic cylinder and ram assembly 18 pivotally connected at its opposite end to the dump body 1 as a lift mechanism by which the body can be tilted about the rear pivot 2 between the hauling position illustrated in full lines in FIG. 1 and a rearwardly inclined position illustrated by broken lines. Thus the load transmitted through the hydraulic cylinder in the downward direction is concentrated in the vertical plane of the front axle 4 and furthermore the body load is more uniformly distributed on the front and rear axles than would be the case if the bottom of the lift mechanism were connected to a forwardly extended main frame section and ahead of the hinged connection between the frames. In other words, if the lift mechanism were connected to a frame portion extended forwardly of the pivot shaft 16, the body load upon projection of the lift mechanism would tend to depress the front end of the frame and impose a larger proportion of the load on the front wheel and axle assembly. Such unequal load distribution is eliminated by the arrangement as here disclosed.

From the above description it will be apparent that the arrangement of the transversely extended pivot shaft maintains the main frame and subframe, including the forwardly extending tow bar of the subframe, in longitudinal alignment and the structure furthermore permits the use of a rigid tow bar which is free from severe stresses and need not be made any stronger than is necessary to sustain tension loads during hauling operations. The frame interpivoted connection enables travel over irregular road surfaces since the front and rear wheel and axle assemblies can move up and down relative to one another in riding over rises and depressions in the road. Similarly, variations in height and tilt of the towing vehicle and the trailer relative to one another can occur as permitted by the pivotal interconnection of the trailer main frame and its forward subframe.

While the foregoing specification has dealt with the details of a preferred embodiment of the invention, it is to be understood that the construction disclosed is capable of such modification and variation as come within the scope of the appended claims.

What is claimed is:

1. In a multiple axle trailer, a rigid tow bar terminated rearwardly in a subframe portion immovably joined as a unit with a tow bar forward portion, a pivot joint member at the front of the tow bar for coupling to a complemental joint member on a towing vehicle, a wheel and axle assembly supporting said subframe portion, a second wheel and axle assembly in rearwardly spaced relation to the first mentioned wheel and axle assembly, load carrying means supported at its rear end on said second wheel and axle assembly and supported at its forward end on said subframe portion and a transversely extending pivot shaft connection joining the load carrying means to and supporting the same on the subframe portion and accommodating their relative rocking movement about the transverse axis of said pivot shaft.

2. In a multiple axle vehicle as in claim 1 wherein said transversely extending pivot shaft connection and the axle of the supporting assembly for the subframe portion are in substantially vertical alignment.

3. In a multiple axle trailer vehicle as in claim 2 wherein the load carrying means comprises a main frame, a dump body superposed on the main frame and rearwardly fulcrumed thereon for allowing backward body tilt between hauling and dumping positions and lift mechanism controlling dump body position and being upwardly connected with the front of the dump body and downwardly connected with said transversely extending pivot shaft connection.

4. In a trailer vehicle, a pair of ground engaging running gear assemblies arranged in tandem succession, load carrying means supported rearwardly thereof on the rearmost running gear assembly, a subframe supported by the forward running gear assembly, a pivotal supporting connection joining the forward portion of the load carrying means and the subframe on a transverse horizontal axis for their relative rocking movement and a rigid tow bar fixed immovably to said subframe and projected forwardly therefrom and provided with a front hitch coupling.

5. In a trailer vehicle, a pair of ground engaging running gear assemblies arranged in tandem succession, a main frame supported rearwardly on the rearmost running gear assembly and provided forwardly thereof with a cross framing member, a subframe supported by the forward running gear assembly and positioned beneath the forward cross frame member, a pair of transversely spaced apart trunnion bearings carried by the subframe and pivotally receiving said cross frame member for relative rocking movement about the transverse horizontal axis of the trunnion bearings, a dump body rearwardly fulcrumed on the main frame, lift mechanism having top and bottom connections respectively joined to the dump body and to said cross frame member centrally between said trunnion bearings and a rigid tow bar projected forwardly from and immovably joined to said subframe and provided with a front end hitch coupling.

6. In a multiple axle trailer, front and rear axle suspension assemblies, a main frame rearwardly supported on the rear suspension assembly, a subframe supported on the front suspension assembly, an elongate rigid tow bar fixed to the subframe against movement relative thereto, means pivotally mounting the front of the main frame on the subframe and comprising a pair of transversely spaced apart trunnion bearings on one of the frames and a transverse shaft mounted in said bearings and fixed to the other frame, a dump body supported on the main frame and rearwardly pivotally connected therewith and lift mechanism joined to the front of the dump body and having a supporting bearing on said transverse shaft intermediate the spaced apart trunnion bearings.

7. In a multiple axle trailer as in claim 6 wherein said transverse shaft is positioned in substantially vertical alignment with the axle of the front suspension assembly.

8. In a trailer vehicle, a main frame, a wheel assembly supporting the rear portion of the main frame, a forward subframe, a forwardly projected tow bar rigidly and immovably connected to the subframe as a solid unit therewith and terminated in a front hitch coupling for attachment to a towing vehicle, a front wheel assembly supporting said subframe and means pivotally connecting the front of the main frame to said subframe on a transverse rocking axis in vertical alignment with the axis of the front wheel assembly.

References Cited in the file of this patent
UNITED STATES PATENTS

| | | |
|---|---|---|
| 2,505,421 | McMurtrie | Apr. 21, 1950 |
| 2,595,474 | Marvin | May 6, 1952 |